US010569900B2

(12) United States Patent
Danielson et al.

(10) Patent No.: US 10,569,900 B2
(45) Date of Patent: *Feb. 25, 2020

(54) METHOD OF AND SYSTEM FOR PRESENTING AN OPERATING STATUS OF AN AIRCRAFT ENGINE

(71) Applicants: BOMBARDIER INC., Dorval (CA); C SERIES AIRCRAFT LIMITED PARTNERSHIP, Mirabel (CA)

(72) Inventors: Michael Dwight Danielson, Montreal (CA); Mathieu Gallea, Montreal (CA)

(73) Assignees: BOMBARDIER INC., Dorval (CA); C SERIES AIRCRAFT LIMITED PARTNERSHIP, Mirabel (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/534,469

(22) Filed: Aug. 7, 2019

(65) Prior Publication Data

US 2019/0359346 A1 Nov. 28, 2019

Related U.S. Application Data

(63) Continuation of application No. 15/764,561, filed as application No. PCT/IB2016/055673 on Sep. 22, 2016, now Pat. No. 10,414,513.

(Continued)

(51) Int. Cl.
*G08B 21/00* (2006.01)
*B64D 45/00* (2006.01)
(Continued)

(52) U.S. Cl.
CPC ............. *B64D 45/00* (2013.01); *B64D 31/00* (2013.01); *B64D 43/00* (2013.01); *G01C 23/00* (2013.01);
(Continued)

(58) Field of Classification Search
CPC ........ B64D 45/00; B64D 31/00; B64D 43/00; G01D 7/04; G01D 7/08; G01C 23/005; G01C 23/00
(Continued)

(56) References Cited

U.S. PATENT DOCUMENTS

| | | |
|---|---|---|
| 3,731,070 A | 5/1973 | Urban |
| 3,750,465 A | 8/1973 | Howell et al. |

(Continued)

FOREIGN PATENT DOCUMENTS

| | | |
|---|---|---|
| EP | 0322158 A2 | 6/1989 |
| EP | 1930239 A1 | 11/2008 |
| WO | 2010092080 A1 | 8/2010 |

OTHER PUBLICATIONS

International Search Report and Written Opinion with regard to PCT/IB2016/055673 dated Dec. 15, 2016.

*Primary Examiner* — Tanmay K Shah
(74) *Attorney, Agent, or Firm* — BCF LLP

(57) ABSTRACT

A method of and a system for presenting an operating status of an aircraft engine. The method comprises accessing a first indication indicative of a position of an aircraft engine start switch and accessing a second indication indicative of an aircraft engine start operating mode, the second indication having been generated based on an analysis of a parameter associated with an operating condition of the aircraft engine. The method, upon determining that the position of the aircraft engine start switch is an "on" position and the aircraft engine start operating mode is a healthy start causes the display of a visual indication indicative of the healthy start. The method upon determining that the position of the aircraft engine start switch is an "on" position and the aircraft engine start operating mode is an abnormal start causes the display of a visual indication indicative of the abnormal start.

20 Claims, 7 Drawing Sheets

Related U.S. Application Data

(60) Provisional application No. 62/234,726, filed on Sep. 30, 2015.

(51) Int. Cl.
   *G01C 23/00* (2006.01)
   *G01D 7/04* (2006.01)
   *G01D 7/08* (2006.01)
   *B64D 43/00* (2006.01)
   *B64D 31/00* (2006.01)

(52) U.S. Cl.
   CPC ............ *G01C 23/005* (2013.01); *G01D 7/04* (2013.01); *G01D 7/08* (2013.01)

(58) Field of Classification Search
   USPC ......................................................... 340/945
   See application file for complete search history.

(56) References Cited

U.S. PATENT DOCUMENTS

| | | |
|---|---|---|
| 4,891,971 A | 1/1990 | Jones et al. |
| 4,908,618 A | 3/1990 | Baker et al. |
| 5,748,500 A | 5/1998 | Quentin et al. |
| 6,470,258 B1 | 10/2002 | Leamy et al. |
| 7,142,131 B2 | 11/2006 | Sikora |
| 7,148,814 B2 | 12/2006 | Sikora et al. |
| 7,246,024 B2 | 7/2007 | Muramatsu et al. |
| 7,369,932 B2 | 5/2008 | Kim et al. |
| 7,506,517 B2 | 3/2009 | Uluyol et al. |
| 7,577,549 B2 | 8/2009 | Osborn et al. |
| 7,679,529 B2 | 3/2010 | Clark et al. |
| 8,103,393 B2 | 1/2012 | Ausman et al. |
| 8,321,120 B2 | 11/2012 | Riley |
| 2007/0234734 A1 | 10/2007 | Uluyol et al. |
| 2008/0136677 A1 | 6/2008 | Clark et al. |
| 2013/0013222 A1 | 1/2013 | Gu et al. |
| 2015/0068293 A1 | 3/2015 | Ding et al. |

```
                    ┌──────────────────────────────────────────────────────────────────────┐
              500 ──│ ACCESS, FROM A NON-TRANSITORY COMPUTER-READABLE MEDIUM, A FIRST      │
                    │ INDICATION INDICATIVE OF A POSITION OF AN AIRCRAFT ENGINE START SWITCH│
                    │                                 502                                   │
                    └──────────────────────────────────┬───────────────────────────────────┘
                                                       ▼
                    ┌──────────────────────────────────────────────────────────────────────┐
                    │ ACCESS, FROM A NON-TRANSITORY COMPUTER-READABLE MEDIUM, A SECOND      │
                    │ INDICATION INDICATIVE OF AN AIRCRAFT ENGINE START OPERATING MODE,    │
                    │ THE SECOND INDICATION HAVING BEEN GENERATED BASED ON AN ANALYSIS OF  │
                    │ A PARAMETER ASSOCIATED WITH AN OPERATING CONDITION OF THE            │
                    │                         AIRCRAFT ENGINE                              │
                    │                                 504                                   │
                    └──────────────────────────────────┬───────────────────────────────────┘
                                                       ▼
                    ┌──────────────────────────────────────────────────────────────────────┐
                    │ UPON DETERMINING, BY A PROCESSING UNIT, BASED ON THE FIRST INDICATION│
                    │ AND THE SECOND INDICATION, THAT THE POSITION OF THE AIRCRAFT ENGINE  │
                    │ START SWITCH IS AN "ON" POSITION AND THE AIRCRAFT ENGINE START       │
                    │            OPERATING MODE IS AN HEALTHY START:                       │
                    │                                 506                                   │
                    └──────────────────────────────────┬───────────────────────────────────┘
                                                       ▼
                    ┌──────────────────────────────────────────────────────────────────────┐
                    │ CAUSE THE DISPLAY OF A FIRST VISUAL INDICATION INDICATIVE OF THE     │
                    │            HEALTHY START OF THE AIRCRAFT ENGINE                      │
                    │                                 508                                   │
                    └──────────────────────────────────┬───────────────────────────────────┘
                                                       ▼
                    ┌──────────────────────────────────────────────────────────────────────┐
                    │ UPON DETERMINING, BY THE PROCESSING UNIT, BASED ON THE FIRST INDICATION│
                    │ AND THE SECOND INDICATION, THAT THE POSITION OF THE AIRCRAFT ENGINE START│
                    │ SWITCH IS AN "ON" POSITION AND THE AIRCRAFT ENGINE START OPERATING MODE│
                    │                       IS AN ABNORMAL START:                          │
                    │                                 510                                   │
                    └──────────────────────────────────┬───────────────────────────────────┘
                                                       ▼
                    ┌──────────────────────────────────────────────────────────────────────┐
                    │ CAUSE THE DISPLAY OF A SECOND VISUAL INDICATION INDICATIVE OF THE    │
                    │           ABNORMAL START OF THE AIRCRAFT ENGINE                      │
                    │                                 512                                   │
                    └──────────────────────────────────────────────────────────────────────┘
```

```
┌─────────────────────────────────────────────────────────────┐
│ CAUSE THE DISPLAY OF A FIRST VISUAL INDICATION INDICATIVE OF A │
│ HEALTHY START OF THE AIRCRAFT ENGINE AS A RESULT OF A DETECTION, BY │
│ A PROCESSING UNIT, THAT A COMMAND TO START THE AIRCRAFT ENGINE │
│                    HAS BEEN ISSUED                          │
│                         702                                 │
└─────────────────────────────────────────────────────────────┘
                              ↓
┌─────────────────────────────────────────────────────────────┐
│ AFTER A PERIOD OF TIME HAS LAPSED, ACCESS, FROM A NON-TRANSITORY │
│   COMPUTER-READABLE MEDIUM, AN INDICATION INDICATIVE OF AN  │
│  AIRCRAFT ENGINE START OPERATING MODE, THE INDICATION HAVING │
│  BEEN GENERATED BASED ON AN ANALYSIS OF A PARAMETER ASSOCIATED │
│      WITH AN OPERATING CONDITION OF THE AIRCRAFT ENGINE     │
│                         704                                 │
└─────────────────────────────────────────────────────────────┘
                              ↓
┌─────────────────────────────────────────────────────────────┐
│ UPON DETERMINING, BY THE PROCESSING UNIT, BASED ON THE INDICATION, │
│ THAT THE AIRCRAFT ENGINE START OPERATING MODE IS AN HEALTHY START │
│                         706                                 │
└─────────────────────────────────────────────────────────────┘
                              ↓
┌─────────────────────────────────────────────────────────────┐
│          MAINTAIN THE DISPLAY OF THE FIRST VISUAL INDICATION │
│                         708                                 │
└─────────────────────────────────────────────────────────────┘
                              ↓
┌─────────────────────────────────────────────────────────────┐
│ UPON DETERMINING, BY THE PROCESSING UNIT, BASED ON THE INDICATION, │
│       THAT THE AIRCRAFT ENGINE START OPERATING MODE IS AN   │
│                      ABNORMAL START:                        │
│                         710                                 │
└─────────────────────────────────────────────────────────────┘
                              ↓
┌─────────────────────────────────────────────────────────────┐
│ CAUSE TO REPLACE THE DISPLAY OF THE FIRST VISUAL INDICATION BY THE │
│ DISPLAY OF A SECOND VISUAL INDICATION INDICATIVE OF THE ABNORMAL │
│                  START OF THE AIRCRAFT ENGINE               │
│                         712                                 │
└─────────────────────────────────────────────────────────────┘
```

FIG.7

METHOD OF AND SYSTEM FOR PRESENTING AN OPERATING STATUS OF AN AIRCRAFT ENGINE

CROSS-REFERENCE

The present application is a continuation of U.S. patent application Ser. No. 15/764,561 filed on Mar. 29, 2018 which is a national stage entry of International Patent Application No. PCT/IB2016/055673 filed on Sep. 22, 2016 which claims priority to U.S. Provisional Patent Application No. 62/234,726, filed Sep. 30, 2015, the entirety of which are incorporated herein by reference.

FIELD

The present technology relates to systems and methods for presenting an operating status of an aircraft engine. In particular, the systems and methods comprise presenting to one or more cabin crew members a visual indication indicative of a healthy start or indicative of an abnormal start, as the case may be.

BACKGROUND

Modern aircraft typically include flight deck displays comprising display screens to present information relating to operating status of various systems of the aircraft to cabin crew members, in particular to a pilot and/or a co-pilot. Such information is typically provided during the various operating phases of the aircraft, for example, when the aircraft is on the ground, in a take-off phase, in an in-flight phase or in a landing phase. The various systems of the aircraft for which information is to be provided to the cabin crew members may have differing levels of criticality and may therefore take higher or lower importance and/or priority on the flight deck displays. Aircraft engines may be classified as one of those critical systems. As a result, multiple indications relating to the operation and/or operating status of the aircraft engines are typically presented to the cabin crew members via the flight deck displays.

Various flight deck display layouts have been developed to present the multiple indications relating to the operation and/or operating status of the aircraft engines such as, for example, a display screen 100 illustrated at FIG. 1. In some instances, the display screen 100 may also be referred to as a primary engine display. The display screen 100 displays information relating to two aircraft engines in a display portion 150 of the display screen 100. The information relating to a first engine is laid out so as to be displayed in a first longitudinal half of the display portion 150. The information relating to a second engine is laid out so as to be displayed in a second longitudinal half of the display portion 150. In some instances, the display portion 150 may have different shapes and/or dimensions so as to accommodate the display of additional information relating (or not) to the aircraft engines. In the example of FIG. 1, the display screen 100 displays values of various aircraft engine parameters such as parameter values 102, 122 associated with a low pressure compressor shaft rotation speed (N1), parameter values 104, 124 associated with an exhaust gas temperature (EGT), parameter values 106, 126 associated with an intermediate compressor shaft rotation speed (N2), parameter values 108, 128 associated with a fuel flow (FF(PPH)), parameter values 110, 130 associated with an oil temperature (OIL TEMP) and parameter values 112, 132 associated with an oil pressure (OIL PRESS). In some instances, the parameter values may also be associated with a graphical icon, such as the parameter values 102, 122 and parameter values 104, 124. The graphical icon may include, for example, a gauge or a portion of a gauge. In some instances, the display screen 100 may also provide access to multiple pages, each one of the pages including one or more parameter values and/or graphical icons.

A conventional approach, as the one illustrated at FIG. 1, requires the flight crew members operating the aircraft to view the parameter values, integrate the parameter values, interpret the parameter values and determine whether the parameter values warrant an action. In addition, the flight crew members not only have to determine that action is required but also have to determine which action amongst multiple actions is required. As an example, the flight crew members may determine that an abnormal start of one of the aircraft engines is occurring based on an interpretation of one or more parameters values. The flight crew members then have to determine which action is required such as, in the example of the abnormal start of one of the aircraft engines, entering a command to shut down the one or more of the aircraft engines.

To address this situation, various approaches have been proposed such as the one depicted in U.S. Pat. No. 7,148,814 to The Boeing Company (the '814 patent). The '814 patent describes a method of and a system for displaying an icon that represents an overall operational state of an aircraft engine. The method also includes directing a change in a displayed characteristic of the icon when the overall operational state of the aircraft engine changes from a started state and an unstarted state and vice-et-versa. The method includes relying on received engine operating parameter signals. The overall operational state of the engine is then determined based on the parameter signals. As an example, an indication that the engine is operating normally can be based on a determination that all the engine operating parameters are within an acceptable range of values and a determination that the engine is operating improperly can be based on a determination that any one of the operating parameters is outside the relevant acceptable range of values. Even though the method and system of the '814 patent may provide improvements in certain conditions, it does present limits, in particular for aircraft including certain types of aircraft engines such as, but not limited to, high bypass ratio aircraft engines.

The high bypass ratio aircraft engines such as, but not limited to, the PurePower PW1500™ from Pratt & Whitney or the Leap-X™ from CFM International may include specific design particularities. Such specific design particularities may result in parameter signals associated with the operation of the one or more engines having different behaviors than parameter signals of aircraft engines of previous generations. Such specific design particularities may include, but are not limited to, specific starter air valve performances and/or specific starter performances. In view of these particularities, improvement to existing methods and systems for displaying icons indicative of an operational state of an aircraft engine is desirable.

SUMMARY

Embodiments of the present technology have been developed based on inventors' appreciation that approaches relying on interpretation of engine operating parameter signals may, in some instances, not be relied upon to properly inform of an operating status of the aircraft engine. Improvements are therefore desirable, in particular improvements aiming at presenting a more reliable operating status of an aircraft engine to one or more cabin crew members.

The present technology arises from an observation made by the inventor(s) that during certain operating conditions of an aircraft engines, a behaviour of parameter values associated with the operation of the aircraft engine, may be as such that it cannot be solely relied upon to determine and present an operating status of the aircraft engine.

Thus, in one aspect, various implementations of the present technology provide computer-implemented method of presenting an operating status of an aircraft engine, the method comprising:
- accessing, from a non-transitory computer-readable medium, a first indication indicative of a position of an aircraft engine start switch;
- accessing, from the non-transitory computer-readable medium, a second indication indicative of an aircraft engine start operating mode, the second indication having been generated based on an analysis of a parameter associated with an operating condition of the aircraft engine;
- upon determining, by a processing unit, based on the first indication and the second indication, that the position of the aircraft engine start switch is an "on" position and the aircraft engine start operating mode is a healthy start:
  - causing the display of a first visual indication indicative of the healthy start of the aircraft engine; and
- upon determining, by the processing unit, based on the first indication and the second indication, that the position of the aircraft engine start switch is an "on" position and the aircraft engine start operating mode is an abnormal start:
  - causing the display of a second visual indication indicative of the abnormal start of the aircraft engine.

In another aspect, the parameter is at least one of an exhaust gas temperature of a combustion chamber of the aircraft engine, a rotation speed of the aircraft engine, a fuel flow of the aircraft engine, an oil pressure of the aircraft engine, an oil temperature of the aircraft engine, an altitude of the aircraft and an air speed of the aircraft, a turbine temperature and a synthesized parameter.

In yet another aspect, the analysis of the parameter comprises an analysis of a first data indicative of an exhaust gas temperature of a combustion chamber of the aircraft engine and a second data indicative of a rotation speed of the aircraft engine.

In another aspect, the first visual indication is a first icon and the second visual indication is a second icon, the first icon being associated with a first color and the second icon being associated with a second color.

In yet another aspect, the first visual indication is a first text field and the second visual indication is a second text field, the first text field being associated with a first text message and the second text field being associated with a second text message.

In another aspect, causing the display of the first visual indication is independent of a displaying of operating parameter values of the aircraft engine.

In yet another aspect, a reading, by a user, of the first visual indication allows establishing that the healthy start of the aircraft engine is occurring without requiring the reading of operating parameter values of the aircraft engine.

In another aspect, a reading, by a user, of the second visual indication allows establishing that the abnormal start of the aircraft engine is occurring without requiring the reading of operating parameter values of the aircraft engine.

In yet another aspect, the first indication is a first boolean value and the second indication is a second boolean value.

In another aspect, the first visual indication is a first portion of a graphical user interface associated with a first graphical component and the second visual indication is the first portion of the graphical user interface associated with a second graphical component, the first portion of the graphical user interface being spaced apart from a second portion of the graphical user interface, the second portion of the graphical user interface displaying operating parameter values of the aircraft engine.

In yet another aspect, the first visual indication is caused to be displayed for a period of time extending from a beginning of a start of the aircraft engine to an idle operating mode of the aircraft engine.

In another aspect, the analysis of the parameter associated with the operating condition of the aircraft engine results in a crew-alerting system (CAS) message indicative of the abnormal start of the aircraft engine being issued.

In yet another aspect, causing the display of the second visual indication indicative of the abnormal start of the aircraft engine comprises replacing the first visual indication with the second visual indication.

In another aspect, the analysis of the parameter associated with the operating condition of the aircraft engine comprises comparing the first data with a first model and the second data with a second model, the first model defining an acceptable behaviour of a variation of the exhaust gas temperature of the combustion chamber of the aircraft engine and the second model defining an acceptable behaviour of a variation of the rotation speed of the aircraft engine.

In yet another aspect, various implementations of the present technology provide a computer-implemented method of presenting an operating status of an aircraft engine, the method comprising:
- determining, by a processing unit, that an aircraft engine start switch is on an "on" position;
- determining, by the processing unit, that a healthy start of the aircraft engine is occurring based on an analysis of a first data indicative of an exhaust gas temperature of a combustion chamber of the aircraft engine and a second data indicative of a rotation speed of the aircraft engine; and
- causing the display of a first visual indication indicative of the determined healthy start of the aircraft engine.

In another aspect, the method further comprises:
- determining, by the processing unit, that an abnormal start of the aircraft engine is occurring based on the analysis of the first data and the second data; and
- causing to replace the first visual indication with a second visual indication indicative of the determined abnormal start of the aircraft engine.

In yet another aspect, the analysis of the first data and the second data comprises comparing the first data with a first model and the second data with a second model, the first model defining an acceptable behaviour of a variation of the exhaust gas temperature of the combustion chamber of the aircraft engine and the second model defining an acceptable behaviour of a variation of the rotation speed of the aircraft engine.

In another aspect, the first visual indication is caused to be displayed for a period of time extending from a beginning of a start of the aircraft engine to an idle operating mode of the aircraft engine.

In yet another aspect, causing the display of the first visual indication is independent of a displaying of operating parameter values of the aircraft engine.

In another aspect, various implementations of the present technology provide a computer-implemented method of presenting an operating status of an aircraft engine, the method comprising:

causing the display of a first visual indication indicative of a healthy start of the aircraft engine as a result of a detection, by a processing unit, that a command to start the aircraft engine has been issued;

after a period of time has lapsed, accessing, from a non-transitory computer-readable medium, an indication indicative of an aircraft engine start operating mode, the indication having been generated based on an analysis of a parameter associated with an operating condition of the aircraft engine;

upon determining, by the processing unit, based on the indication, that the aircraft engine start operating mode is a healthy start:

maintaining the display of the first visual indication; and upon determining, by the processing unit, based on the indication, that the aircraft engine start operating mode is an abnormal start:

causing to replace the display of the first visual indication by the display of a second visual indication indicative of the abnormal start of the aircraft engine.

In another aspect, the period of time comprises a first period of time and a second period of time, the first period of time starting at the issuance of the command to start the aircraft engine and ending at an ignition of the aircraft engine and the second period of time starting at the ignition of the aircraft engine and ending at a predefined amount of time.

In yet another aspect, the analysis of the parameter associated with the operating condition of the aircraft engine comprises comparing the parameter with a predefined threshold and wherein the abnormal start is determined to be the aircraft engine operating mode if the parameter does not exceed the predefined threshold during the period of time.

In another aspect, the analysis of the parameter associated with the operating condition of the aircraft engine comprises comparing the parameter with a predefined threshold and wherein the healthy start is determined to be the aircraft engine operating mode if the parameter exceeds the predefined threshold during the first period of time.

In yet another aspect, the predefined amount of time ranges from 3 seconds to 90 seconds.

In another aspect, the period of time ranges from 3 seconds to 90 seconds.

In yet another aspect, the method comprising, prior to causing the display of the first visual indication indicative of the healthy start of the aircraft engine:

accessing, from the non-transitory computer-readable medium, a second indication indicative of a position of an aircraft engine start switch.

In another aspect, the detection, by the processing unit, that the command to start the aircraft engine has been issued comprises determining, by the processing unit, based on the second indication, that the position of the aircraft engine start switch is an "on" position.

In yet another aspect, the method further comprises:

upon determining, by the processing unit, that a command to stop the aircraft engine has been issued:

causing to stop the display of the first visual indication.

In another aspect, determining, by the processing unit, that the command to stop the aircraft engine has been issued comprises determining, by the processing unit, based on the second indication, that the position of the aircraft engine start switch is an "off" position.

In yet another aspect, the parameter is at least one of an exhaust gas temperature of a combustion chamber of the aircraft engine, a rotation speed of the aircraft engine, a fuel flow of the aircraft engine, an oil pressure of the aircraft engine, an oil temperature of the aircraft engine, an altitude of the aircraft and an air speed of the aircraft, a turbine temperature and a synthesized parameter.

In another aspect, the analysis of the parameter comprises an analysis of a first data indicative of an exhaust gas temperature of a combustion chamber of the aircraft engine and a second data indicative of a rotation speed of the aircraft engine.

In yet another aspect, the first visual indication is a first icon and the second visual indication is a second icon, the first icon being associated with a first color and the second icon being associated with a second color.

In another aspect, the first visual indication is a first text field and the second visual indication is a second text field, the first text field being associated with a first text message and the second text field being associated with a second text message.

In yet another aspect, causing the display of the first visual indication is independent of a displaying of operating parameter values of the aircraft engine.

In another aspect, a reading, by a user, of the first visual indication allows establishing that the healthy start of the aircraft engine is occurring without requiring the reading of operating parameter values of the aircraft engine.

In yet another aspect, a reading, by a user, of the second visual indication allows establishing that the abnormal start of the aircraft engine is occurring without requiring the reading of operating parameter values of the aircraft engine.

In another aspect, the analysis of the parameter associated with the operating condition of the aircraft engine results in a crew-alerting system (CAS) message indicative of the abnormal start of the aircraft engine being issued.

In yet another aspect, the analysis of the parameter associated with the operating condition of the aircraft engine comprises comparing the first data with a first model and the second data with a second model, the first model defining an acceptable behaviour of a variation of the exhaust gas temperature of the combustion chamber of the aircraft engine and the second model defining an acceptable behaviour of a variation of the rotation speed of the aircraft engine.

In another aspect, the analysis of the parameter associated with the operating condition of the aircraft engine has been performed after the predetermined period of time has lapsed.

In yet another aspect, the period of time is measured from the detection that the command to start the aircraft has been issued.

In another aspect, the period of time is measured from a detection of an ignition of the aircraft engine.

In yet another aspect, the parameter associated with the operating condition of the aircraft engine is accessible before the period of time has lapsed.

In another aspect, the parameter associated with the operating condition of the aircraft engine is not accessible before the period of time has lapsed.

In another aspect, various implementations of the present technology provide a computer-implemented system for presenting an operating status of an aircraft engine, the system comprising:
 a non-transitory computer-readable medium;
 a processor configured to perform:
  accessing, from the non-transitory computer-readable medium, a first indication indicative of a position of an aircraft engine start switch;
  accessing, from the non-transitory computer-readable medium, a second indication indicative of an aircraft engine start operating mode, the second indication having been generated based on an analysis of a parameter associated with an operating condition of the aircraft engine;
  upon determining, by the processing unit, based on the first indication and the second indication, that the position of the aircraft engine start switch is an "on" position and the aircraft engine start operating mode is a healthy start:
   causing the display of a first visual indication indicative of the healthy start of the aircraft engine; and
  upon determining, by the processing unit, based on the first indication and the second indication, that the position of the aircraft engine start switch is an "on" position and the aircraft engine start operating mode is an abnormal start:
   causing the display of a second visual indication indicative of the abnormal start of the aircraft engine.

In another aspect, the parameter is at least one of an exhaust gas temperature of a combustion chamber of the aircraft engine, a rotation speed of the aircraft engine, a fuel flow of the aircraft engine, an oil pressure of the aircraft engine, an oil temperature of the aircraft engine, an altitude of the aircraft and an air speed of the aircraft, a turbine temperature and a synthesized parameter.

In yet another aspect, the analysis of the parameter comprises an analysis of a first data indicative of an exhaust gas temperature of a combustion chamber of the aircraft engine and a second data indicative of a rotation speed of the aircraft engine.

In another aspect, the first visual indication is a first icon and the second visual indication is a second icon, the first icon being associated with a first color and the second icon being associated with a second color.

In yet another aspect, the first visual indication is a first text field and the second visual indication is a second text field, the first text field being associated with a first text message and the second text field being associated with a second text message.

In another aspect, causing the display of the first visual indication is independent of a displaying of operating parameter values of the aircraft engine.

In yet another aspect, a reading, by a user, of the first visual indication allows establishing that the healthy start of the aircraft engine is occurring without requiring the reading of operating parameter values of the aircraft engine.

In another aspect, a reading, by a user, of the second visual indication allows establishing that the abnormal start of the aircraft engine is occurring without requiring the reading of operating parameter values of the aircraft engine.

In yet another aspect, the first indication is a first boolean value and the second indication is a second boolean value.

In another aspect, the first visual indication is a first portion of a graphical user interface associated with a first graphical component and the second visual indication is the first portion of the graphical user interface associated with a second graphical component, the first portion of the graphical user interface being spaced apart from a second portion of the graphical user interface, the second portion of the graphical user interface displaying operating parameter values of the aircraft engine.

In yet another aspect, the first visual indication is caused to be displayed for a period of time extending from a beginning of a start of the aircraft engine to an idle operating mode of the aircraft engine.

In another aspect, the analysis of the parameter associated with the operating condition of the aircraft engine results in a crew-alerting system (CAS) message indicative of the abnormal start of the aircraft engine being issued.

In yet another aspect, causing the display of the second visual indication indicative of the abnormal start of the aircraft engine comprises replacing the first visual indication with the second visual indication.

In another aspect, the analysis of the parameter associated with the operating condition of the aircraft engine comprises comparing the first data with a first model and the second data with a second model, the first model defining an acceptable behaviour of a variation of the exhaust gas temperature of the combustion chamber of the aircraft engine and the second model defining an acceptable behaviour of a variation of the rotation speed of the aircraft engine.

In another aspect, various implementations of the present technology provide a computer-implemented system for presenting an operating status of an aircraft engine, the system comprising:
 a non-transitory computer-readable medium;
 a processor configured to perform:
  determining, by the processing unit, that an aircraft engine start switch is on an "on" position;
  determining, by the processing unit, that a healthy start of the aircraft engine is occurring based on an analysis of a first data indicative of an exhaust gas temperature of a combustion chamber of the aircraft engine and a second data indicative of a rotation speed of the aircraft engine; and
  causing the display of a first visual indication indicative of the determined healthy start of the aircraft engine.

In another aspect, the processor is further configured to perform:
 determining, by the processing unit, that an abnormal start of the aircraft engine is occurring based on the analysis of the first data and the second data; and
 causing to replace the first visual indication with a second visual indication indicative of the determined abnormal start of the aircraft engine.

In yet another aspect, the analysis of the first data and the second data comprises comparing the first data with a first model and the second data with a second model, the first model defining an acceptable behaviour of a variation of the exhaust gas temperature of the combustion chamber of the aircraft engine and the second model defining an acceptable behaviour of a variation of the rotation speed of the aircraft engine.

In another aspect, the first visual indication is caused to be displayed for a period of time extending from a beginning of a start of the aircraft engine to an idle operating mode of the aircraft engine.

In yet another aspect, causing the display of the first visual indication is independent of a displaying of operating parameter values of the aircraft engine.

In another aspect, various implementations of the present technology provide a computer-implemented system for presenting an operating status of an aircraft engine, the system comprising:
a non-transitory computer-readable medium;
a processor configured to perform:
causing the display of a first visual indication indicative of a healthy start of the aircraft engine as a result of a detection, by the processing unit, that a command to start the aircraft engine has been issued;
after a period of time has lapsed, accessing, from the non-transitory computer-readable medium, an indication indicative of an aircraft engine start operating mode, the indication having been generated based on an analysis of a parameter associated with an operating condition of the aircraft engine;
upon determining, by the processing unit, based on the indication, that the aircraft engine start operating mode is a healthy start:
maintaining the display of the first visual indication; and
upon determining, by the processing unit, based on the indication, that the aircraft engine start operating mode is an abnormal start:
causing to replace the display of the first visual indication by the display of a second visual indication indicative of the abnormal start of the aircraft engine.

In another aspect, the period of time comprises a first period of time and a second period of time, the first period of time starting at the issuance of the command to start the aircraft engine and ending at an ignition of the aircraft engine and the second period of time starting at the ignition of the aircraft engine and ending at a predefined amount of time.

In yet another aspect, the analysis of the parameter associated with the operating condition of the aircraft engine comprises comparing the parameter with a predefined threshold and wherein the abnormal start is determined to be the aircraft engine operating mode if the parameter does not exceed the predefined threshold during the period of time.

In another aspect, the analysis of the parameter associated with the operating condition of the aircraft engine comprises comparing the parameter with a predefined threshold and wherein the healthy start is determined to be the aircraft engine operating mode if the parameter exceeds the predefined threshold during the first period of time.

In yet another aspect, the predefined amount of time ranges from 3 seconds to 90 seconds.

In another aspect, the period of time ranges from 3 seconds to 90 seconds.

In yet another aspect, the processor is further configured to perform, prior to causing the display of the first visual indication indicative of the healthy start of the aircraft engine:
accessing, from the non-transitory computer-readable medium, a second indication indicative of a position of an aircraft engine start switch.

In another aspect, the detection, by the processing unit, that the command to start the aircraft engine has been issued comprises determining, by the processing unit, based on the second indication, that the position of the aircraft engine start switch is an "on" position.

In yet another aspect, the processor is further configured to perform:
upon determining, by the processing unit, that a command to stop the aircraft engine has been issued:
causing to stop the display of the first visual indication.

In another aspect, determining, by the processing unit, that the command to stop the aircraft engine has been issued comprises determining, by the processing unit, based on the second indication, that the position of the aircraft engine start switch is an "off" position.

In yet another aspect, the parameter is at least one of an exhaust gas temperature of a combustion chamber of the aircraft engine, a rotation speed of the aircraft engine, a fuel flow of the aircraft engine, an oil pressure of the aircraft engine, an oil temperature of the aircraft engine, an altitude of the aircraft and an air speed of the aircraft, a turbine temperature and a synthesized parameter.

In another aspect, the analysis of the parameter comprises an analysis of a first data indicative of an exhaust gas temperature of a combustion chamber of the aircraft engine and a second data indicative of a rotation speed of the aircraft engine.

In yet another aspect, the first visual indication is a first icon and the second visual indication is a second icon, the first icon being associated with a first color and the second icon being associated with a second color.

In another aspect, the first visual indication is a first text field and the second visual indication is a second text field, the first text field being associated with a first text message and the second text field being associated with a second text message.

In yet another aspect, causing the display of the first visual indication is independent of a displaying of operating parameter values of the aircraft engine.

In another aspect, a reading, by a user, of the first visual indication allows establishing that the healthy start of the aircraft engine is occurring without requiring the reading of operating parameter values of the aircraft engine.

In yet another aspect, a reading, by a user, of the second visual indication allows establishing that the abnormal start of the aircraft engine is occurring without requiring the reading of operating parameter values of the aircraft engine.

In another aspect, the analysis of the parameter associated with the operating condition of the aircraft engine results in a crew-alerting system (CAS) message indicative of the abnormal start of the aircraft engine being issued.

In yet another aspect, the analysis of the parameter associated with the operating condition of the aircraft engine comprises comparing the first data with a first model and the second data with a second model, the first model defining an acceptable behaviour of a variation of the exhaust gas temperature of the combustion chamber of the aircraft engine and the second model defining an acceptable behaviour of a variation of the rotation speed of the aircraft engine.

In another aspect, the analysis of the parameter associated with the operating condition of the aircraft engine has been performed after the predetermined period of time has lapsed.

In yet another aspect, the period of time is measured from the detection that the command to start the aircraft has been issued.

In another aspect, the period of time is measured from a detection of an ignition of the aircraft engine.

In yet another aspect, the parameter associated with the operating condition of the aircraft engine is accessible before the period of time has lapsed.

In another aspect, the parameter associated with the operating condition of the aircraft engine is not accessible before the period of time has lapsed.

In other aspects, various implementations of the present technology provide a non-transitory computer-readable medium storing program instructions for presenting an operating status of an aircraft engine, the program instructions being executable by a processor of a computer-based system to carry out one or more of the above-recited methods.

In other aspects, various implementations of the present technology provide a computer-based system, such as, for example, but without being limitative, a device comprising at least one processor and a memory storing program instructions for presenting an operating status of an aircraft engine, the program instructions being executable by one or more processors of the computer-based system to carry out one or more of the above-recited methods.

In the context of the present specification, unless expressly provided otherwise, a computer system may refer, but is not limited to, an "electronic device", a "controller", an "aircraft engine controller", a "flight computer", an "avionic computer", an "Engine-Indicating and Crew-Alerting System (EICAS)", a "Engine Controller Computer (ECC)", a "Full Authority Digital Engine Control (FADEC)", a "server", a, "remote server", a "computer-based system" and/or any combination thereof appropriate to the relevant task at hand. Thus, some non-limiting examples of hardware and/or software include computers (flight computer, digital computer, etc.), aircraft equipment (controller, display screen, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a data could include the data itself (i.e. its contents), or it could be a unique data descriptor identifying a file with respect to a particular file system, or some other means of directing the recipient of the indication to a network location, memory address, database table, signal (whether analogic or numeric) or other location where the file may be accessed. As one skilled in the art would recognize, the degree of precision required in such an indication depends on the extent of any prior understanding about the interpretation to be given to data being exchanged as between the sender and the recipient of the indication. For example, if it is understood prior to a communication between a sender and a recipient that an indication of data element will take the form of a database key for an entry in a particular table of a predetermined database containing the data element, then the sending of the database key is all that is required to effectively convey the data element to the recipient, even though the data element itself was not transmitted as between the sender and the recipient of the indication.

In the context of the present specification, unless expressly provided otherwise, a "visual indication" may refer to a graphical icon and/or other forms of visual indicators which may or may not include alpha/numeric textual information. The visual indication may also broadly refer to a graphical element which may or may not be an icon and which is designed so as to visually announce an event and/or an operating status of an aircraft system (such as an aircraft engine) in a way which aims at reducing a cognitive effort required by a user to interpret the event and/or the operating status of the aircraft system. The user may typically be, but not limited to, one or more cabin crew members such as a pilot and/or a co-pilot. The visual indication may be presented to the user through a wide variety of supports such as a display screen or a projection device (either worn by the user or directly mounted on the aircraft). Multiple variations regarding how the visual indication is designed and how the visual indication is presented to the user may be envisioned without departing from the scope of the present technology and will become apparent to the person skilled in the art.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first indication" and "second indication" is not intended to imply any particular order, type, chronology, hierarchy or ranking (for example) of/between the indications, nor is their use (by itself) intended to imply that any "third indication" must necessarily exist in any given situation. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 5 is a diagram illustrating a first flowchart illustrating a computer-implemented method implementing embodiments of the present technology;

FIG. 7 is a diagram illustrating a third flowchart illustrating a computer-implemented method implementing embodiments of the present technology.

Figure 1:
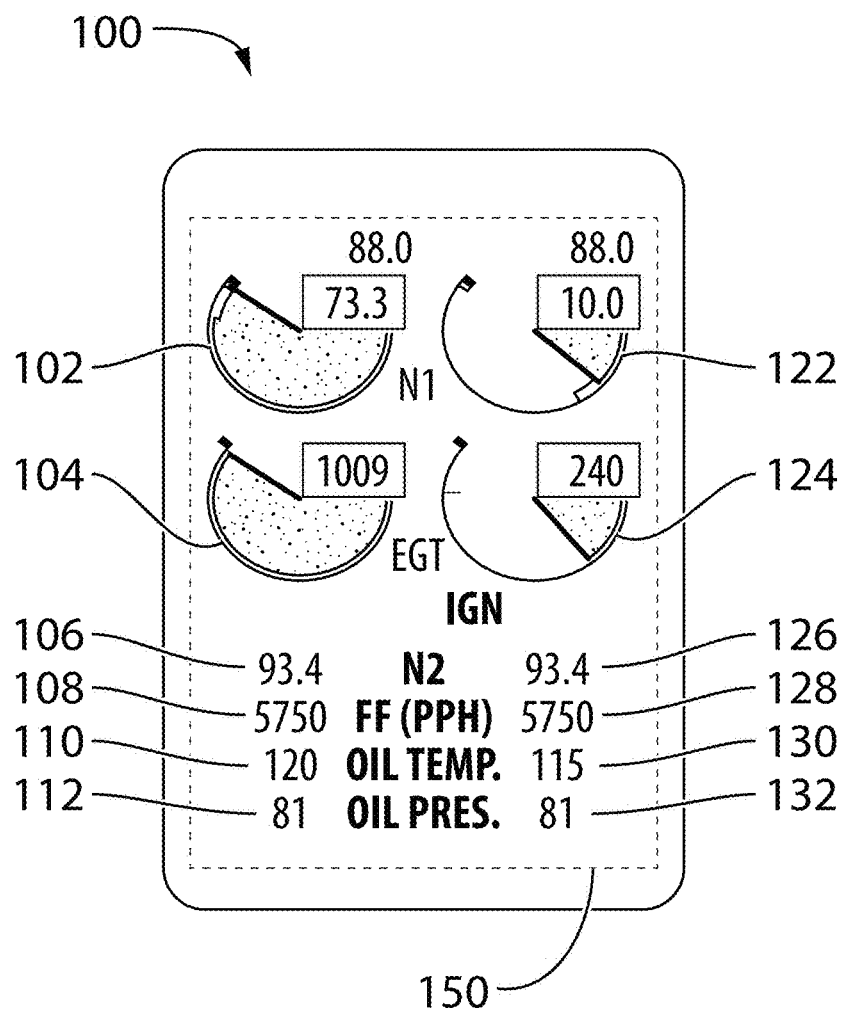
FIG. 1 is a diagram of a display screen in accordance with the prior art.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", a "controller" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Figure 2:
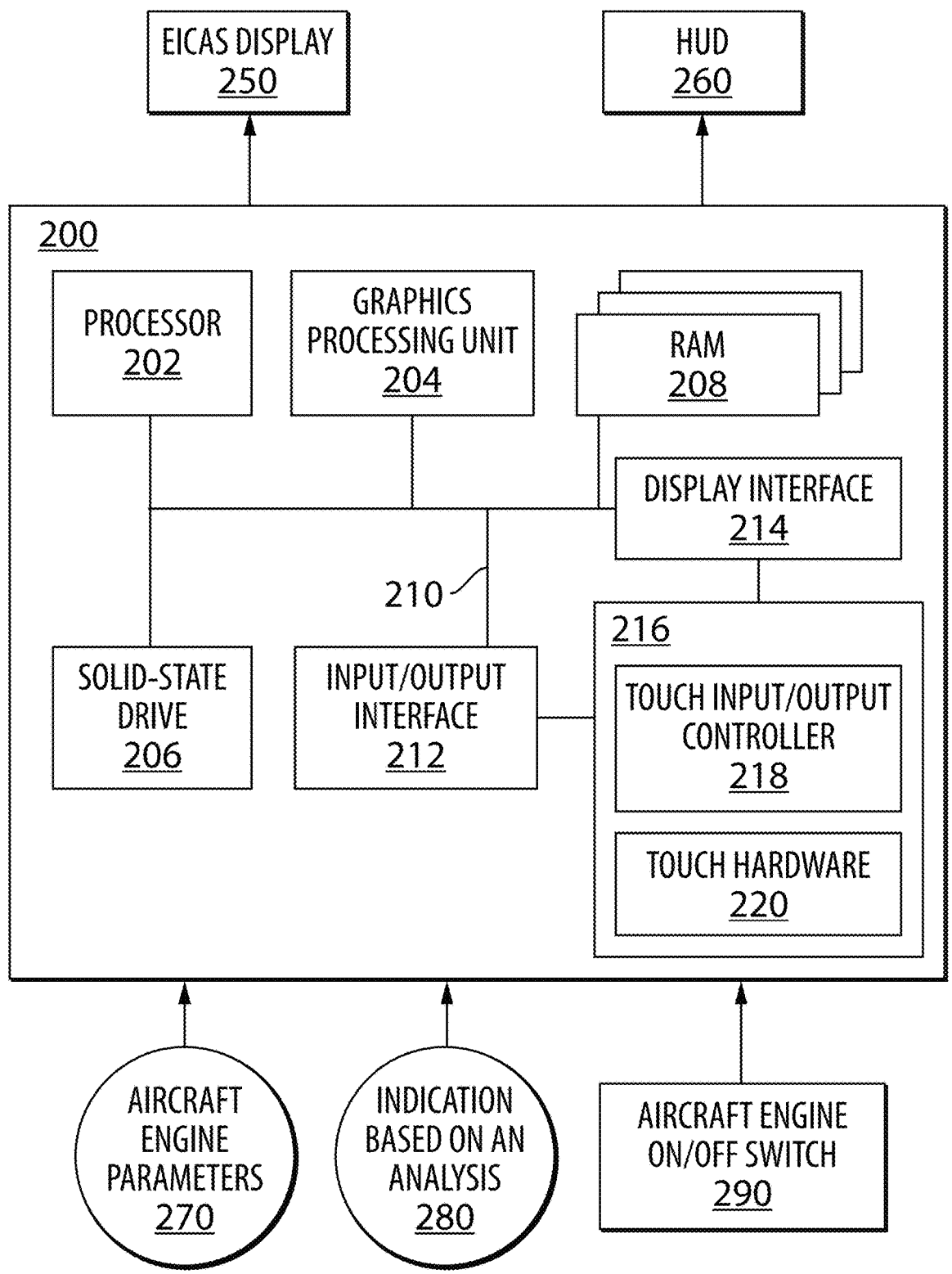
FIG. 2 is a diagram of a networked computing environment in accordance with an embodiment of the present technology.

Referring to FIG. 2, there is shown a computer system 200 suitable for use with some implementations of the present technology, the computer system 200 comprising various hardware components including one or more single or multi-core processors collectively represented by processor 202, a graphics processing unit (GPU) 204, a solid-state drive 206, a random access memory 208, a display interface 214, and an input/output interface 212. The computer system 200 may be an avionic computer specifically designed for installation into an aircraft. In some alternative embodiments, the computer system 200 may be a generic computer system adapted to meet certain requirements, such as, but not limited to, certification requirements. As previously mentioned in the sections above, the computer system 200 may be a controller", an "aircraft engine controller", a "flight computer", an "avionic computer", an "Engine-Indicating and Crew-Alerting System (EICAS)", a "Engine Controller Computer (ECC)" or a "Full Authority Digital Engine Control (FADEC)". The computer system 200 may also be a sub-system of one of the above-listed systems. In some other embodiments, the computer system 200 may be an "off the shelf" generic computer system. In some embodiments, the computer system 200 may also be distributed amongst multiple systems. The computer system 200 may also be specifically dedicated to the implementation of the present technology. Alternatively, the computer system 200 may be configured to implement multiple functions, including the implementation of the present technology. As a person in the art of the present technology may appreciate, multiple variations as to how the computer system 200 is implemented may be envisioned without departing from the scope of the present technology.

Communication between the various components of the computer system 200 may be enabled by one or more internal and/or external buses 210 (e.g. a PCI bus, universal serial bus, IEEE 1394 "Firewire" bus, SCSI bus, Serial-ATA bus, ARINC bus, etc.), to which the various hardware components are electronically coupled. A display interface 214 may be coupled to a display 250 (e.g., via a cable or a bus) and/or a "Head-Up Display (HUD)" 260. In some embodiments, the display 250 is an EICAS display. In some other embodiments, the display 250 is not solely dedicated to displaying information relating to an aircraft engine. In such embodiments, the display 250 may be configured to display other information not relating to the aircraft engine, such as, for example, but without being limitative, navigational information.

The input/output interface 212 may be coupled to a touchscreen 216 and to the one or more internal and/or external buses 210. The touchscreen 216 may be part of the display 250 or may be a separate display. In the embodiments illustrated in FIG. 2, the touchscreen 216 comprises touch hardware 220 (e.g., pressure-sensitive cells embedded in a layer of a display allowing detection of a physical interaction between a user and the display) and a touch input/output controller 218 allowing communication with the display interface 214 and/or the one or more internal and/or external buses 210. In some embodiments, the input/output interface 212 may be connected to a keyboard (not shown), a mouse (not shown) or a trackpad (not shown) allowing the user to interact with the computer system 200 in addition or in replacement of the touchscreen.

According to implementations of the present technology, the solid-state drive 206 stores program instructions suitable for being loaded into the random access memory 208 and executed by the processor 202 and/or the GPU 204 for processing activity indications associated with a user. For example, the program instructions may be part of a library or an application.

In the example of FIG. 2, the computer system 200 may be in communication with multiple systems, such as, but not limited to, an aircraft engine controller (not shown) and a control panel (not shown). The aircraft engine controller may be configured so that the computer system may access aircraft engine parameters 270 and/or an indication based on an analysis 280. The aircraft engine controller may be, for example, but without being limitative, an ECC and/or a FADEC. The aircraft engine controller may be in direct or in indirect communication with the computer system 200. In some embodiments, the computer system 200 may access the aircraft engine parameters 270 and/or the indication 280. In some embodiments, the aircraft engine controller may transmit the aircraft engine parameters 270 and/or the indication 280 without authorizing the computer system 200 to access a memory of the aircraft engine controller per se. As a person skilled in the art of the present technology may appreciate, "accessing" the aircraft engine parameters 270 and/or the indication 280 may be construed as authorizing the computer system 200 to read the memory of the aircraft engine controller and/or sending data relating to the aircraft engine parameters 270 and/or the indication 280 without having the computer system 200 directly access the memory of the aircraft engine controller. Other variations may also be envisioned and may become apparent to the person skilled in the art of the present technology.

As previously mentioned, the computer system 200 may be in communication with a control panel comprising an aircraft engine "on/off" switch 290. The control panel may be a dedicated portion of a dashboard of a cockpit of the aircraft. In some embodiments, the control panel may be physical (e.g., includes physical knobs and switches) and/or virtual (e.g., virtual knobs and/or switches graphically represented on a display such as the display 250 and/or the touchscreen 216). The aircraft engine "on/off" switch 290 may therefore be a physical and/or a virtual switch. It should be understood that the term "switch" should not be construed as being limitative and encompasses multiple variations allowing a user to command a starting of the aircraft engine. Such multiple variations may include switches, knobs, graphical icons, button, swipes on the touchscreen, vocal commands, etc. Those examples are not limitative and other variations will become apparent to the person skilled in the art of the present technology.

Figure 3:
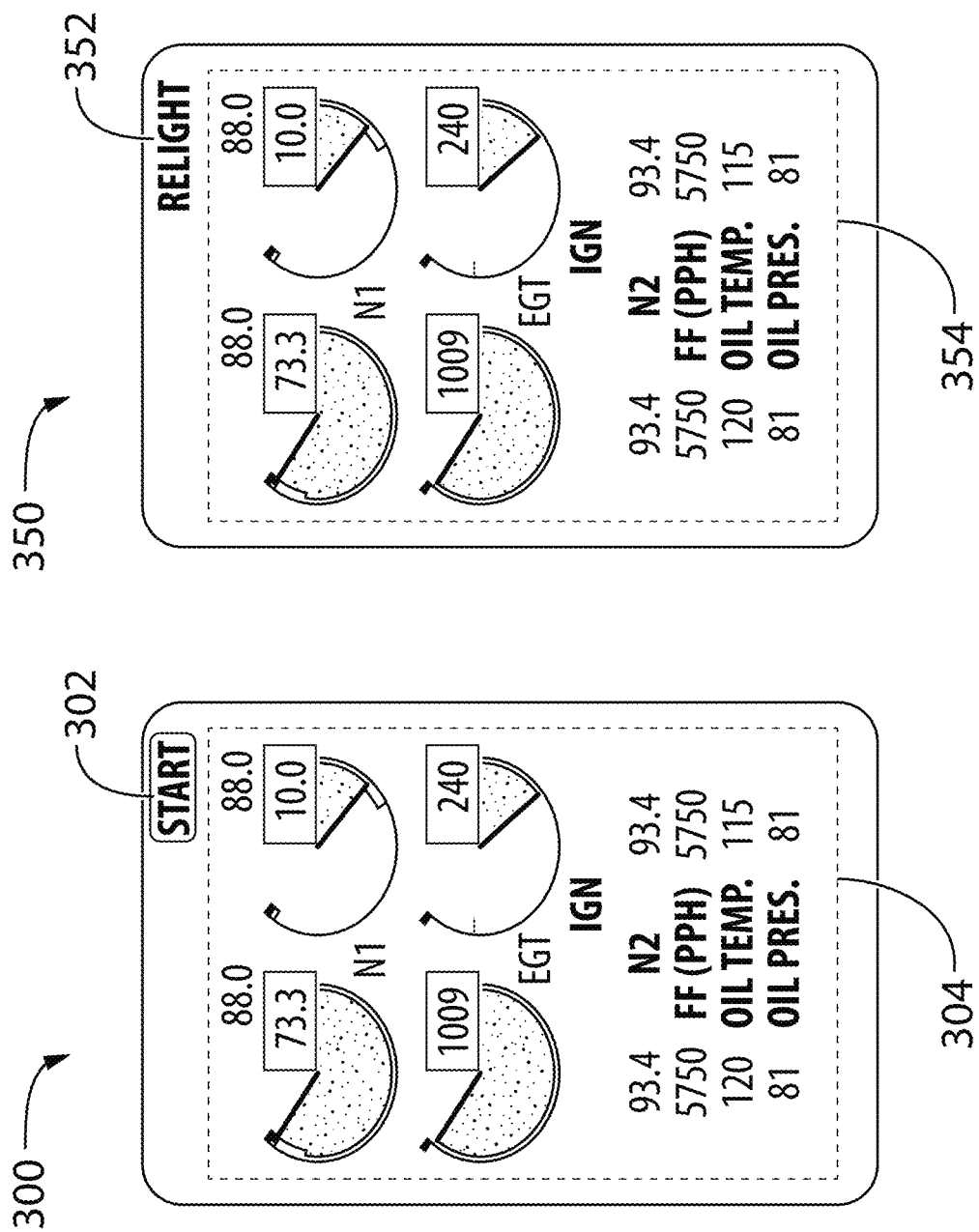
FIG. 3 is a diagram illustrating display screens in accordance with an embodiment of the present technology.

Turning now to FIG. 3, a first display screen 300 and a second display screen 350 are shown. The first display screen 300 may also be referred to as a primary engine display. The first display screen 300 displays information relating to two aircraft engines in a display portion 304 of the first display screen 300. In an embodiment, the information relating to the two aircraft engines is similar to the information displayed in the display portion 150 of the display screen 100 illustrated at FIG. 1. As in the display portion 150, the information relating to a first engine is laid out so as to be displayed in a first longitudinal half of the display portion 304. The information relating to a second engine is laid out so as to be displayed in a second longitudinal half of the display portion 304. In some instances, the display portion 304 may have different shapes and/or dimension so as to accommodate the display of additional information relating (or not) to the aircraft engines. As in the example of FIG. 1, the display screen 300 displays values of various aircraft engine parameters such as parameter values associated with a low pressure compressor shaft rotation speed (N1), parameter values associated with an exhaust gas temperature (EGT), parameter values associated with an intermediate compressor shaft rotation speed (N2), parameter values associated with a fuel flow (FF(PPH)), parameter values associated with an oil temperature (OIL TEMP), parameter values associated with an oil pressure (OIL PRESS) and parameter values associated with a turbine temperature (which may include an intermediate turbine temperature and, more broadly, any temperature values measured in the turbine). In some embodiments, the aircraft engine parameters may also include synthesized parameter values calculated from a plurality of parameter values. As an example, but without being limited thereto, the synthesized parameter values may include the synthesized parameter values (Nmix) which represent an interpolation of the parameter values N1 and the parameter values N2. In some instances, the parameter values may also be associated with a graphical icon, such as the parameter values corresponding to the parameter values 102, 122 of FIG. 1 and parameter values corresponding to the parameter values 104, 124 of FIG. 1. The graphical icon may include, for example, a gauge or a portion of a gauge. In some instances, the display screen 300 may also provide access to multiple pages, each one of the pages including one or more parameter values and/or graphical icons. As a person skilled in the art of the present technology may appreciate, many variations may be envisioned as to (i) how the lay out of the first display screen 300 may be configured and (ii) what information the first display screen 300 may present to the cabin crew members without departing from the scope of the present technology.

The first display screen 300 also comprises a first visual indication 302. The first visual indication 302 may be indicative of an operating status of an aircraft engine. Even though reference is made to "an" aircraft engine, it should be understood the first visual indication 302 may be indicative of an operating status of more than one aircraft engine (e.g., two engines, three engines, four engines, etc. . . . ). It should also be understood that the aircraft engine may be broadly defined as being associated with a propulsion function to generate mechanical power. In some other instances, the aircraft engine may also be broadly defined as being associated with functions other than propulsion, for example, but without being limitative, an "Auxiliary Power Unit (APU)". In some embodiments, the operating status of the aircraft engine is associated with a specific operating condition of the aircraft engine. Such specific operating condition of the aircraft may include a starting phase of the aircraft engine.

The starting phase may be broadly defined as a phase allowing the aircraft engine to go from a shut down (or partially shut down) state to a running (or partially running) state. The starting phase may occur on the ground when the aircraft is stationary or in a taxing phase and/or in flight when certain circumstances may require the aircraft engine to be started and/or relighted as the case may be. In some embodiments wherein the aircraft engine is a gas turbine engine, the starting phase may require a rotation of a compressor to a speed that provides sufficient pressurised air to a combustion chamber. A starting system generates the rotation to the compressor, at least until combustion starts. In some embodiments, the starting system may be one of an electric starter, a hydraulic starter and/or an air starter. However, multiple variations as to how the starting system is embodied may be envisioned without departing from the scope of the present technology. In some embodiments, the starting system may be designed so as to overcome inertia of the compressor and friction loads. The starting system may be designed to remain in operation after combustion starts (i.e., after ignition starts) and may be disengaged after the aircraft engine has reached self-idling speed. In some embodiments, the starting phase may be defined as a period of time during which the starting system is operated. In some other embodiments, the period of time may extend after the starting system, for example, after the aircraft engine has reached a certain operating regime.

As previously explained a monitoring of certain parameters may occur during the starting phase to determine a status associated with the starting phase. In some embodiments, the status may equally be referred to as an aircraft engine start operating mode. In some embodiments, a first aircraft engine start operating mode may be a healthy start and a second aircraft engine start operating mode may be an abnormal start. The healthy start may be determined by a computer-implemented system such as, for example, but without being limited to, a FADEC. The healthy start may be configured to inform the cabin crew members that the starting phase is operating normally. The healthy start may be interpreted by the cabin crew members as a positive indication that the starting phase does not require a specific action which would have otherwise been required if the starting phase was not progressing normally. In some embodiments, the abnormal start, as with the healthy start, may be determined by a computer-implemented system such as, for example, but without being limited to, the FADEC. The abnormal start may be configured to inform the cabin crew members that the starting phase is not operating normally. The abnormal start may be interpreted by the cabin crew members as a negative indication that the starting phase requires a specific action and/or a specific attention. The specific action may include for example, but without being limitative, a shut down of the engine, a modification of a thrust parameter associated with the aircraft engine, a beginning of an emergency procedure, etc. The specific attention may include for example, but without being limitative, a visual monitoring of the indication associated with the status (e.g., to monitor whether the indication goes back to a "healthy start" status within a given period of time), a visual monitoring of certain parameters associated with the operating condition of the aircraft engine, etc. Other examples of what constitutes a specific action and/or a specific attention may be envisioned without departing from the scope of the present technology.

As also previously explained, monitoring of certain parameters to determine a status associated with the starting phase may present certain limits, in particular when a design of the aircraft engine leads to less predictable variations of the certain parameters. The design of the aircraft may include specific starter air valve performances and/or specific starter performances which might result from the design of the aircraft engine itself (or the design of certain sub-systems of the aircraft engine) or from the design of monitoring systems (or the design of certain sub-systems of the monitoring systems) such as certain particularities in a location of sensors and/or limits of certain sensors. Such certain parameters, may include, but without being limited thereto, an exhaust gas temperature of the combustion chamber of the aircraft engine, a rotation speed of the aircraft engine, a fuel flow of the aircraft engine, an oil pressure of the aircraft engine, an oil temperature of the aircraft engine, an altitude of the aircraft and an air speed of the aircraft. Other type of parameters, or combination of parameters, may also be envisioned without departing from the scope of the present technology.

As a result of the above, the present technology aims at presenting an operating status of an aircraft engine based on certain steps which comprise causing the display of the first visual indication 302 as a result of a detection, by a processing unit, that a command to start the aircraft engine has been issued. The command may have been generated by the FADEC, whether as a result of an action of the cabin crew members or automatically. The command may also be generated by a system other than the FADEC. Accordingly, the system generating the command should not be construed as being limited to the FADEC. Multiple variations may become apparent to the person skilled in the art of the present technology.

The first visual indication 302 is indicative of a healthy start. In some embodiments, the first visual indication 302 may be displayed to the cabin crew members without taking into consideration an analysis of one or more parameters associated with an operating condition of the aircraft engine. In some embodiments, a period of time determines a moment at which the analysis may start to be taken into consideration to update (either leave as is, modify or replace) the first visual indication 302. In some embodiments, the analysis may start before the period of time lapses meaning that the analysis may at least partially be conducted even though it is not taken into consideration to update the visual indication 302. In some embodiments, the period of time may be defined so as to start when the command to start the aircraft engine is issued. In some other embodiments, the period of time may be defined so as to start when the combustion chamber is ignited (for example, when a command to ignite the aircraft engine is issued). In some embodiments, the period of time may also include a first sub-period of time extending from when the command to start the aircraft engine is issued to a detection that the combustion chamber is ignited. In some embodiments, the period of time may also include a second sub-period of time starting when the combustion chamber is ignited and ending after a predefined period of time lapsed. In some embodiments, the first sub-period of time may range from 8 seconds to 10 seconds. In some other embodiments, the first sub-period of time may be about 20 seconds. In some other embodiments, the first sub-period of time may be about 60 seconds (for example, when the aircraft is in flight and the aircraft engine needs to be relighted). In some embodiments, the second sub-period of time may range from 13 seconds to 15 seconds. In some other embodiments, the second sub-period of time may be about 30 seconds. In some embodiments, the period of time may comprise at least one of the first sub-period of time and the second sub-period of time and may range from 3 seconds to 90 seconds. In some embodiments, the period of time may be broadly defined as a period of time required for certain parameters to reach a certain threshold and/or consistency and/or to behave in a manner which allows a determination of an operating status with sufficient accuracy. In some embodiments, the period of time may be defined so that an exhaust gas temperature of the combustion chamber and/or a rotation speed of the aircraft engine reach a certain threshold, for example 5% of their respective maximum value. As a person skilled in the art of the present technology may appreciate, various ranges may be associated so as to define the period of time and/or the first sub-period of time and/or the second period of time and/or threshold and may be envisioned without departing from the scope of the present technology.

As indicated above, prior to the period of time having lapsed, the first visual indication 302 may be displayed to the cabin crew. More specifically, in some embodiments, prior to one or more parameters associated with the operating condition of the aircraft engine being taken into consideration, the first visual indication 302 indicative that the operational status of the engine is a healthy start is displayed to the cabin crew members, regardless of the actual operational status of the engine.

In some embodiments, once the period of time has lapsed, the analysis of the one or more parameters associated with the operating condition of the aircraft engine may start to be taken into consideration to update (either leave as is, modify or replace) the first visual indication 302. In some embodiments, if the analysis results in a determination that the aircraft engine start operating mode is an abnormal start, then the first visual indication 302 may be updated, for example, but without being limited to, replacing the first visual indication 302 with a second visual indication 402 (shown in FIG. 4) indicative of the abnormal start.

In some embodiments, the first visual indication 302 is an icon associated with a color and/or a text field that conveys a healthy engine start. For example, the first visual indication 302 may be associated with a green color and/or a text field reciting "START". The text field is itself located within a rectangle. In some alternative embodiments, the text field may recite "HEALTHY START". As a person skilled in the art of the present technology may appreciate, multiple variations as to how the first visual indication 302 (i.e, shape, color, text, animation, etc. . . . ) is implemented may be envisioned without departing from the scope of the present technology.

Still referring to FIG. 3, the second display screen 350 illustrates a display screen similar to the first display screen 300 including a display portion 304 with the exception that an alternative embodiment of the first visual indication is represented. This alternative embodiment may be referred to as a first visual indication 352. In some embodiments, the first visual indication 352 may be associated with a relighting of the aircraft engine. As previously discussed, the relighting of the aircraft engine may occur when the aircraft is in flight or when the aircraft engine may rely, at least partially, on ram air to provide sufficient energy to ignite the combustion chamber of the aircraft engine. In the embodiments illustrated at FIG. 3, the first visual indication 352 is associated with a green color and a text field reciting "RELIGHT". The first visual indication 352 may be displayed to the cabin crew members so as to indicate that a healthy start is ongoing during a relighting of the aircraft engine.

Figure 4:
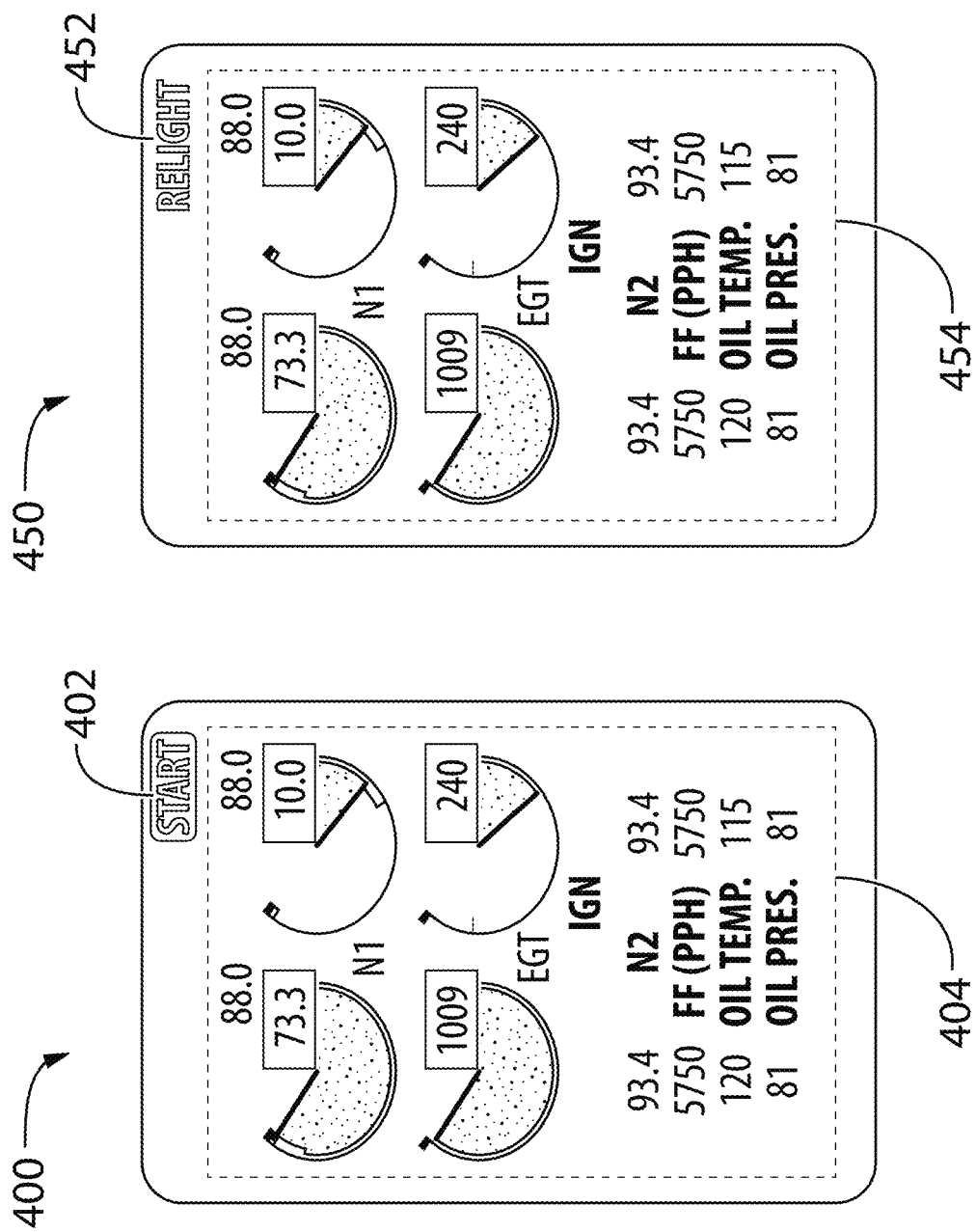
FIG. 4 is a diagram illustrating display screens in accordance with another embodiment of the present technology.

Turning now to FIG. 4, a third display screen 400 and a fourth display screen 450 are shown. The third display screen 400 illustrates a display screen similar to the first display screen 300 including a display portion 404 with the exception that a second visual indication 402 is presented to the cabin crew members. The second visual indication 402 is indicative of a status abnormal start meaning that a determination has been made that the status of the aircraft engine start is abnormal. The second visual indication 402 is an icon associated with a color and/or a text field that conveys an abnormal start. For example, the second visual indication 302 may be associated with an amber color and/or a text field reciting "START". The text field is itself located within a rectangle. In some alternative embodiments, the text field may recite "ABNORMAL START". As a person skilled in the art of the present technology may appreciate, multiple variations as to how the second visual indication 402 (i.e, shape, color, text, animation, etc. . . . ) is implemented may be envisioned without departing from the scope of the present technology. In some embodiments, the second visual indication 402 may associated with multiple colors. As an example, the second visual indication 402 may be associated with a color amber to indicate to the cabin crew members that specific attention should be given to the various parameters and/or a color read to indicate to the cabin crew members that specific action should be undertaken.

Still referring to FIG. 4, the fourth display screen 450 illustrates a display screen similar to the first display screen 400 including a display portion 454 with the exception that an alternative embodiment of the second visual indication is represented. This alternative embodiment may be referred to as a second visual indication 452. In some embodiments, the second visual indication 452 may be associated with a relighting of the aircraft engine. As previously discussed, the relighting of the aircraft engine may occur when the aircraft is in flight. In the embodiments illustrated at FIG. 4, the second visual indication 452 is associated with an amber color and a text field reciting "RELIGHT". The second visual indication 452 may be displayed to the cabin crew members so as to indicate that an abnormal start is ongoing during a relighting of the aircraft engine.

Figure 6:
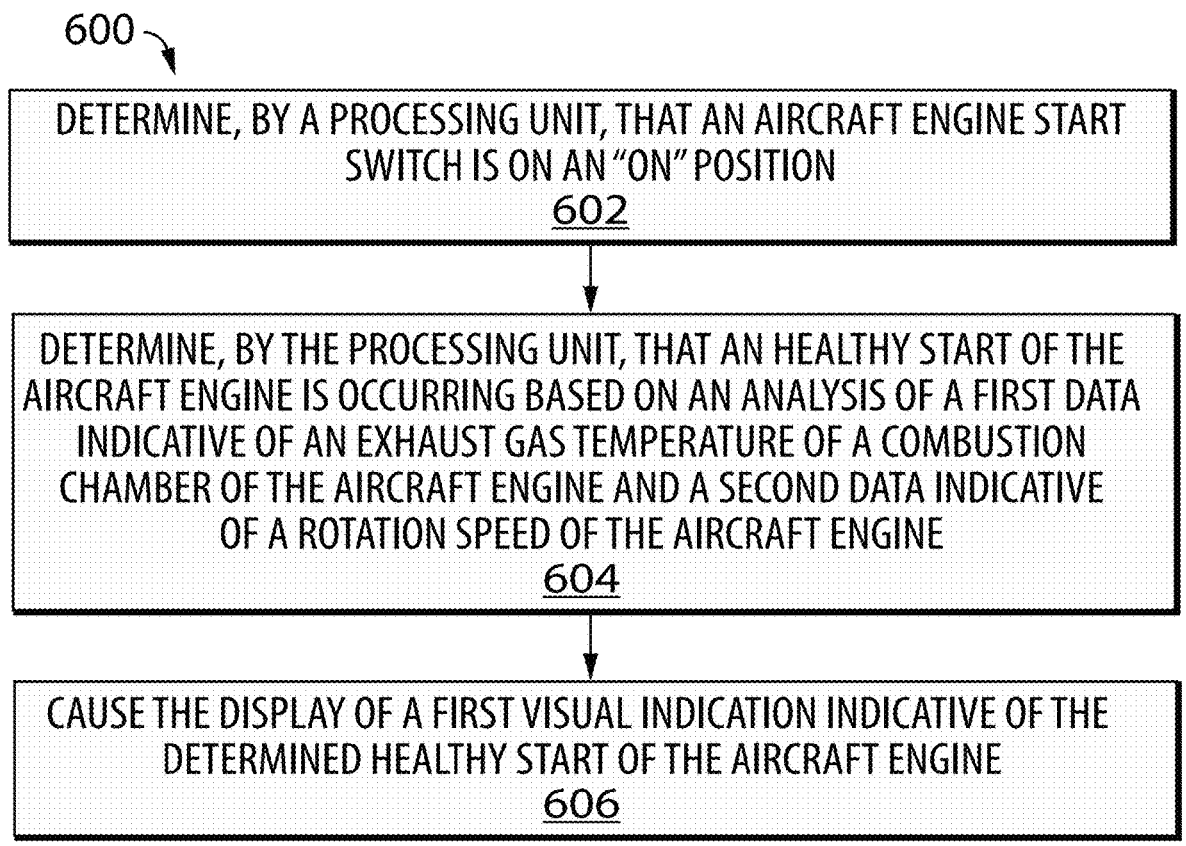
FIG. 6 is a diagram illustrating a second flowchart illustrating a computer-implemented method implementing embodiments of the present technology.

Having described, with reference to FIG. 1 to FIG. 4, some non-limiting example instances of systems and computer-implemented methods used in connection with the problem of presenting an operating status of an aircraft engine, we shall now describe general solutions to the problem with reference to FIG. 5 to FIG. 7.

More specifically, FIG. 5 shows a flowchart illustrating a first computer-implemented method 500 of presenting an operating status of an aircraft engine. In some embodiments, the operating status relates to an aircraft engine start status. In some embodiments, the first computer-implemented method 500 may be (completely or partially) implemented on the computer system 200.

The method 500 starts at step 502 by accessing, from a non-transitory computer-readable medium of the computer system 200 or from another non-transitory computer-readable medium, a first indication indicative of a position of an aircraft engine start switch. In some embodiments, determining that an aircraft engine start switch is on an "on" position may include determining that a command to start the aircraft engine has been issued without monitoring and/or conducting a determination of the switch per se.

At a step 504, the method 500 accesses, from the non-transitory computer-readable medium, a second indication indicative of an aircraft engine start operating mode, the second indication having been generated based on an analysis of a parameter associated with an operating condition of the aircraft engine. It should be understood that the non-transitory computer-readable medium from which the second indication is accessed may be, but does not necessarily need to be, a same non-transitory computer-readable medium from which the first indication is accessed. In some embodiments, the parameter is at least one of an exhaust gas temperature of a combustion chamber of the aircraft engine, a rotation speed of the aircraft engine, a fuel flow of the aircraft engine, an oil pressure of the aircraft engine, an oil temperature of the aircraft engine, an altitude of the aircraft and an air speed of the aircraft. In some embodiments, the analysis of the parameter comprises an analysis of a first data indicative of an exhaust gas temperature of a combustion chamber of the aircraft engine and a second data indicative of a rotation speed of the aircraft engine. In some embodiments, the analysis of the parameter associated with the operating condition of the aircraft engine comprises comparing the first data with a first model and the second data with a second model, the first model defining an acceptable behaviour of a variation of the exhaust gas temperature of the combustion chamber of the aircraft engine and the second model defining an acceptable behaviour of a variation of the rotation speed of the aircraft engine. In some embodiments, the first indication is a first boolean value and the second indication is a second boolean value, the first boolean value may be indicative of a position of an aircraft engine start switch and the second boolean value may be indicative of an output of the analysis (i.e., a first value associated with a determination that a healthy start is occurring and a second value associated with a determination that an abnormal start is occurring). In some embodiments, the first boolean value may be generated by directly monitoring the position of the switch. In some other embodiments, the first boolean value may be generated by indirectly monitoring the position of the switch, for example by monitoring whether a command to start the aircraft engine has been issued.

Then, at a step 506, upon determining, by a processing unit of the computer system 200, based on the first indication and the second indication, that the position of the aircraft engine start switch is an "on" position and the aircraft engine start operating mode is a healthy start, the method 500 executes a step 508. The step 508 comprises causing the display of a first visual indication indicative of the healthy start of the aircraft engine. In some embodiments, the first visual indication is a first icon and the second visual indication is a second icon, the first icon being associated with a first color and the second icon being associated with a second color. In yet some other embodiments, the first visual indication is a first text field and the second visual indication is a second text field, the first text field being associated with a first text message and the second text field being associated with a second text message. In some embodiments, causing the display of the first visual indication is independent of a displaying of operating parameter values of the aircraft engine. In some embodiments, a reading, by a user (such as one or more of the cabin crew members), of the first visual indication allows establishing that the healthy start of the aircraft engine is occurring without requiring the reading of operating parameter values of the aircraft engine.

At a step 510, upon determining, by the processing unit, based on the first indication and the second indication, that the position of the aircraft engine start switch is an "on" position and the aircraft engine start operating mode is an abnormal start, the method executes a step 512. The step 512 comprises causing the display of a second visual indication indicative of the abnormal start of the aircraft engine. In some embodiments, a reading, by the user, of the second visual indication allows establishing that the abnormal start of the aircraft engine is occurring without requiring the reading of operating parameter values of the aircraft engine. This facilitates the job of the cabin crew members, since they do not have to view the operating parameter values, integrate the parameter values and interpret the meaning of the parameter values. Instead, they simply need to observe the visual indication being displayed to understand the operating status of the engine.

In some embodiments of the method 500, the analysis of the parameter associated with the operating condition of the aircraft engine results in a crew-alerting system (CAS) message indicative of the abnormal start of the aircraft engine being issued.

In some embodiments of the method 500, the first visual indication is a first portion of a graphical user interface associated with a first graphical component and the second visual indication is the first portion of the graphical user interface associated with a second graphical component. The first portion of the graphical user interface may be spaced apart from a second portion of the graphical user interface, the second portion of the graphical user interface displaying operating parameter values of the aircraft engine.

In some embodiments of the method 500, the first visual indication is caused to be displayed for a period of time extending from a beginning of a start of the aircraft engine to an idle operating mode of the aircraft engine. In some embodiments, causing the display of the second visual indication indicative of the abnormal start of the aircraft engine comprises replacing the first visual indication with the second visual indication.

Turning now to FIG. 6, there is shown a flowchart illustrating a second computer-implemented method 600 of presenting an operating status of an aircraft engine. In some embodiments, the operating status relates to an aircraft engine start status. In some embodiments, the second computer-implemented method 600 may be (completely or partially) implemented on the computer system 600.

The method 600 starts at step 602 by determining, by a processing unit of the computer system 200 or from another computing unit, that an aircraft engine start switch is on an "on" position. In some embodiments, determining that an aircraft engine start switch is in an "on" position may include determining that a command to start the aircraft engine has been issued without monitoring and/or conducting a determination on the switch per se.

The method 600 then executes a step 604 by determining, by the processing unit, that a healthy start of the aircraft engine is occurring based on an analysis of a first data indicative of an exhaust gas temperature of a combustion chamber of the aircraft engine and a second data indicative of a rotation speed of the aircraft engine. In some embodiments, the analysis of the first data and the second data comprises comparing the first data with a first model and the second data with a second model, the first model defining an acceptable behaviour of a variation of the exhaust gas temperature of the combustion chamber of the aircraft engine and the second model defining an acceptable behaviour of a variation of the rotation speed of the aircraft engine. The method 600 then executes a step 606 by causing the display of a first visual indication indicative of the determined healthy start of the aircraft engine. In some embodiments, the method 600 further comprises a first additional step and a second additional step. The first additional step comprises determining, by the processing unit, that an abnormal start of the aircraft engine is occurring based on the analysis of the first data and the second data. The second additional step comprises causing to replace the first visual indication with a second visual indication indicative of the determined abnormal start of the aircraft engine. In some embodiments of the method 600, the first visual indication is caused to be displayed for a period of time extending from a beginning of a start of the aircraft engine to an idle operating mode of the aircraft engine. In some other embodiments of the method 600, causing the display of the first visual indication is independent of a displaying of operating parameter values of the aircraft engine.

Turning now to FIG. 7, there is shown a flowchart illustrating a third computer-implemented method 700 of presenting an operating status of an aircraft engine. In some embodiments, the operating status relates to an aircraft engine start status. In some embodiments, the third computer-implemented method 700 may be (completely or partially) implemented on the computer system 700.

The method 700 starts at a step 702 by causing the display of a first visual indication indicative of a healthy start of the aircraft engine as a result of a detection, by a processing unit of the computer system 200 or from another computing unit, that a command to start the aircraft engine has been issued. In some embodiments, the method 700 comprises accessing, from the non-transitory computer-readable medium, a second indication indicative of a position of an aircraft engine start switch prior to causing the display of the first visual indication indicative of the healthy start of the aircraft engine. The method 700 pursues with a step 704. The step 704 comprises, after a period of time has lapsed, accessing, from a non-transitory computer-readable medium of the computer system 200 or from another computing unit, an indication indicative of an aircraft engine start operating mode, the indication having been generated based on an analysis of a parameter associated with an operating condition of the aircraft engine. In some embodiments, the parameter is at least one of an exhaust gas temperature of a combustion chamber of the aircraft engine, a rotation speed of the aircraft engine, a fuel flow of the aircraft engine, an oil pressure of the aircraft engine, an oil temperature of the aircraft engine, an altitude of the aircraft and an air speed of the aircraft. In some embodiments, the analysis of the parameter comprises an analysis of a first data indicative of an exhaust gas temperature of a combustion chamber of the aircraft engine and a second data indicative of a rotation speed of the aircraft engine. In some embodiments, the period of time comprises a first period of time and a second period of time, the first period of time starting at the issuance of the command to start the aircraft engine and ending at an ignition of the aircraft engine and the second period of time starting at the ignition of the aircraft engine and ending at a predefined amount of time. In some embodiments, the analysis of the parameter associated with the operating condition of the aircraft engine comprises comparing the parameter with a predefined threshold and wherein the abnormal start is determined to be the aircraft engine operating mode if the parameter does not exceed the predefined threshold during the period of time. In some embodiments, the analysis of the parameter associated with the operating condition of the aircraft engine comprises comparing the parameter with a predefined threshold and wherein the healthy start is determined to be the aircraft engine operating mode if the parameter exceeds the predefined threshold during the first period of time. In some embodiments, the predefined amount of time ranges from 3 seconds to 90 seconds. In some other embodiments, the period of time ranges from 3 seconds to 90 seconds. In some embodiments, the period of time is measured from a detection of an ignition of the aircraft engine. In some embodiments, the period of time is measured from the detection that the command to start the aircraft has been issued.

In some embodiments, the analysis of the parameter associated with the operating condition of the aircraft engine comprises comparing first data indicative of exhaust gas temperature with a first model and second data indicative of engine rotation speed with a second model, the first model defining an acceptable behaviour of a variation of the exhaust gas temperature of the combustion chamber of the aircraft engine and the second model defining an acceptable behaviour of a variation of the rotation speed of the aircraft engine. In some embodiments, the analysis of the parameter associated with the operating condition of the aircraft engine is performed after the predetermined period of time has lapsed. In some embodiments, the parameter associated with the operating condition of the aircraft engine is accessible before the period of time has lapsed, but an analysis of the parameter is not performed until after the period of time has lapsed. In some embodiments, the parameter associated with the operating condition of the aircraft engine is not accessible before the period of time has lapsed.

Then, the method 700, at a step 706, executes upon determining by the processing unit, based on the indication, that the aircraft engine start operating mode is a healthy start, a step 708. The step 708 includes maintaining the display of the first visual indication. The method 700 also comprises a step 710. The step 710 executes upon determining, by the processing unit, based on the indication, that the aircraft engine start operating mode is an abnormal start, a step 712. The step 712 includes causing to replace the display of the first visual indication by the display of a second visual indication indicative of the abnormal start of the aircraft engine.

In some embodiments of the method 700, the detection, by the processing unit, that the command to start the aircraft engine has been issued comprises determining, by the processing unit, based on the second indication, that the position of the aircraft engine start switch is an "on" position. In some other embodiments, the method 700 comprises causing to stop the display of the first visual indication upon determining, by the processing unit, that a command to stop the aircraft engine has been issued. In some embodiments, determining, by the processing unit, that the command to stop the aircraft engine has been issued comprises determining, by the processing unit, based on the second indication, that the position of the aircraft engine start switch is an "off" position.

In some embodiments of the method 700, the first visual indication is a first icon and the second visual indication is a second icon, the first icon being associated with a first color and the second icon being associated with a second color. In some embodiments, the first visual indication is a first text field and the second visual indication is a second text field, the first text field being associated with a first text message and the second text field being associated with a second text message. In some embodiments, causing the display of the first visual indication is independent of a displaying of operating parameter values of the aircraft engine. In some embodiments, a reading, by a user, of the first visual indication allows establishing that the healthy start of the aircraft engine is occurring without requiring the reading of operating parameter values of the aircraft engine. In some embodiments, a reading, by a user, of the second visual indication allows establishing that the abnormal start of the aircraft engine is occurring without requiring the reading of operating parameter values of the aircraft engine. In some alternative embodiments, the analysis of the parameter associated with the operating condition of the aircraft engine results in a crew-alerting system (CAS) message indicative of the abnormal start of the aircraft engine being issued.

While the above-described implementations have been described and shown with reference to particular steps performed in a particular order, it will be understood that these steps may be combined, sub-divided, or re-ordered without departing from the teachings of the present technology. The steps may be executed in parallel or in series. Accordingly, the order and grouping of the steps is not a limitation of the present technology.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented system for presenting an operating status of an aircraft engine, the system comprising:
    a non-transitory computer-readable medium;
    a processor configured to perform:
        determining, by the processing unit, that an aircraft engine start switch is on an "on" position;
            determining, by the processing unit, that a healthy start of the aircraft engine is occurring based on an analysis of a first data indicative of an exhaust gas temperature of a combustion chamber of the aircraft engine and a second data indicative of a rotation speed of the aircraft engine; and
        causing the display of a first visual indication indicative of the determined healthy start of the aircraft engine.

2. The system of claim 1, wherein the processor is further configured to perform:
    determining, by the processing unit, that an abnormal start of the aircraft engine is occurring based on the analysis of the first data and the second data; and
    causing to replace the first visual indication with a second visual indication indicative of the determined abnormal start of the aircraft engine.

3. The system of claim 1, wherein the analysis of the first data and the second data comprises comparing the first data with a first model and the second data with a second model, the first model defining an acceptable behaviour of a variation of the exhaust gas temperature of the combustion chamber of the aircraft engine and the second model defining an acceptable behaviour of a variation of the rotation speed of the aircraft engine.

4. The system of claim 1, wherein the first visual indication is caused to be displayed for a period of time extending from a beginning of a start of the aircraft engine to an idle operating mode of the aircraft engine.

5. The system of claim 1, wherein causing the display of the first visual indication is independent of a displaying of operating parameter values of the aircraft engine.

6. A computer-implemented system for presenting an operating status of an aircraft engine, the system comprising:
    a non-transitory computer-readable medium;
    a processor configured to perform:
        causing the display of a first visual indication indicative of a healthy start of the aircraft engine as a result of a detection, by the processing unit, that a command to start the aircraft engine has been issued;
        after a period of time has lapsed, accessing, from the non-transitory computer-readable medium, an indication indicative of an aircraft engine start operating mode, the indication having been generated based on an analysis of a parameter associated with an operating condition of the aircraft engine;
        upon determining, by the processing unit, based on the indication, that the aircraft engine start operating mode is a healthy start:
            maintaining the display of the first visual indication; and
        upon determining, by the processing unit, based on the indication, that the aircraft engine start operating mode is an abnormal start:
            causing to replace the display of the first visual indication by the display of a second visual indication indicative of the abnormal start of the aircraft engine.

7. The system of claim 6, wherein the period of time comprises a first period of time and a second period of time, the first period of time starting at the issuance of the command to start the aircraft engine and ending at an ignition of the aircraft engine and the second period of time starting at the ignition of the aircraft engine and ending at a predefined amount of time.

8. The system of claim 6, wherein the analysis of the parameter associated with the operating condition of the aircraft engine comprises comparing the parameter with a predefined threshold and wherein the abnormal start is determined to be the aircraft engine operating mode if the parameter does not exceed the predefined threshold during the period of time.

9. The system of claim 6, wherein the analysis of the parameter associated with the operating condition of the aircraft engine comprises comparing the parameter with a predefined threshold and wherein the healthy start is determined to be the aircraft engine operating mode if the parameter exceeds the predefined threshold during the first period of time.

10. The system of claim 7, wherein the predefined amount of time ranges from 3 seconds to 90 seconds.

11. The system of claim 6, wherein the period of time ranges from 3 seconds to 90 seconds.

12. The system of claim 6, the processor being further configured to perform, prior to causing the display of the first visual indication indicative of the healthy start of the aircraft engine:
    accessing, from the non-transitory computer-readable medium, a second indication indicative of a position of an aircraft engine start switch.

13. The system of claim 12, wherein the detection, by the processing unit, that the command to start the aircraft engine has been issued comprises determining, by the processing unit, based on the second indication, that the position of the aircraft engine start switch is an "on" position.

14. The system of claim 12, the processor being further configured to perform:

upon determining, by the processing unit, that a command to stop the aircraft engine has been issued:
causing to stop the display of the first visual indication.

15. The system of claim 14, wherein determining, by the processing unit, that the command to stop the aircraft engine has been issued comprises determining, by the processing unit, based on the second indication, that the position of the aircraft engine start switch is an "off" position.

16. The system of claim 6, wherein causing the display of the first visual indication is independent of a displaying of operating parameter values of the aircraft engine.

17. The system of claim 6, wherein a reading, by a user, of the first visual indication allows establishing that the healthy start of the aircraft engine is occurring without requiring the reading of operating parameter values of the aircraft engine.

18. The system of claim 6, wherein a reading, by a user, of the second visual indication allows establishing that the abnormal start of the aircraft engine is occurring without requiring the reading of operating parameter values of the aircraft engine.

19. The system of claim 6, wherein the analysis of the parameter associated with the operating condition of the aircraft engine has been performed after the predetermined period of time has lapsed.

20. A computer-implemented system for presenting an operating status of an aircraft engine, the system comprising:

a non-transitory computer-readable medium;
a processor configured to perform:
accessing, from the non-transitory computer-readable medium, a first indication indicative of a position of an aircraft engine start switch;
accessing, from the non-transitory computer-readable medium, a second indication indicative of an aircraft engine start operating mode, the second indication having been generated based on an analysis of a parameter associated with an operating condition of the aircraft engine;
upon determining, by the processing unit, based on the first indication and the second indication, that the position of the aircraft engine start switch is an "on" position and the aircraft engine start operating mode is a healthy start:
causing the display of a first visual indication indicative of the healthy start of the aircraft engine; and
upon determining, by the processing unit, based on the first indication and the second indication, that the position of the aircraft engine start switch is an "on" position and the aircraft engine start operating mode is an abnormal start:
causing the display of a second visual indication indicative of the abnormal start of the aircraft engine.

* * * * *